Feb. 11, 1936. G. A. MILLER 2,030,755
ADJUSTABLE PARTITION FOR CATTLE STALLS
Filed April 12, 1934 2 Sheets-Sheet 1
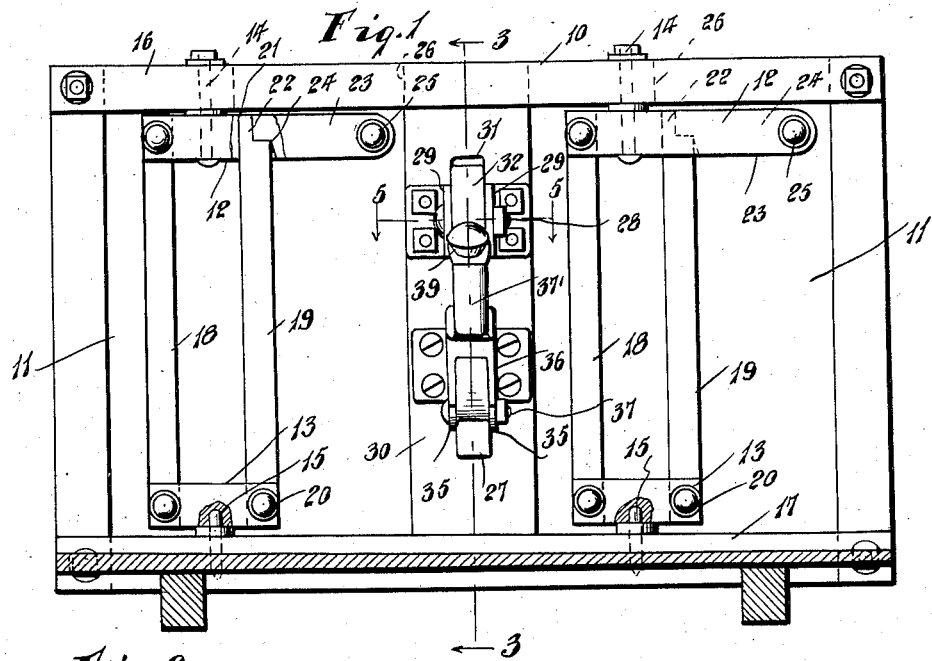
Inventor
George A. Miller, Feb. 11, 1936.    G. A. MILLER    2,030,755
ADJUSTABLE PARTITION FOR CATTLE STALLS
Filed April 12, 1934    2 Sheets-Sheet 2
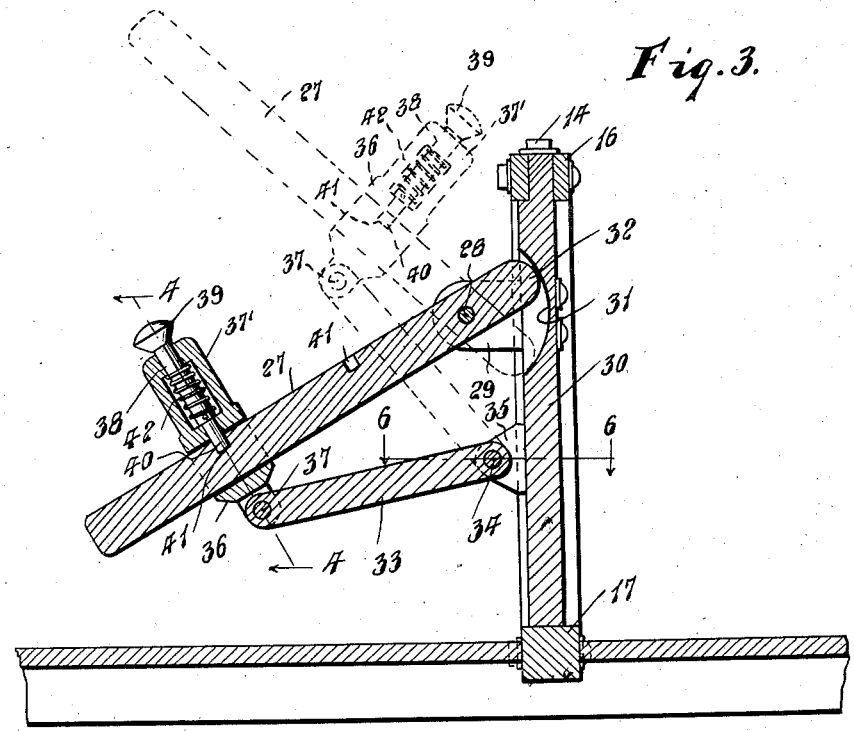
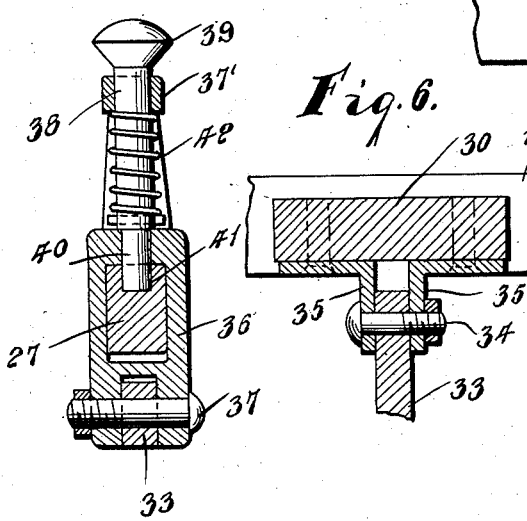
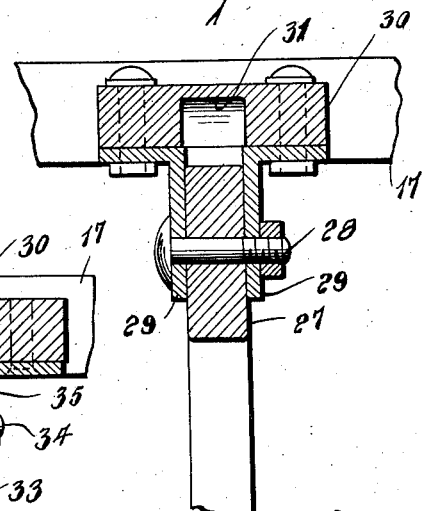
Inventor
George A. Miller.
By L. F. Randulph Jr.
Attorney Patented Feb. 11, 1936

2,030,755

UNITED STATES PATENT OFFICE 2,030,755

ADJUSTABLE PARTITION FOR CATTLE STALLS

George A. Miller, South Gilboa, N. Y.

Application April 12, 1934, Serial No. 720,290

1 Claim. (Cl. 119—15)

The invention relates to stabling of cattle and has for its object the provision of an improved construction of partition for cattle stalls whereby in one position the partition provides an effective barrier between adjacent stalls, and in another position the partition is moved out of the way so that the cattle in the stalls may be quickly released.

The invention will be described in detail hereinafter and will be found illustrated in the accompanying drawing in which Figure 1 is a front view in elevation of a stall with my improved partition shown mounted thereon, the stall being shown mounted on a stable floor that is shown in section, Figure 2 is a top plan view of two adjacent stalls with the partition in position thereon, the floor of the barn being shown fragmentarily, Figure 3 is a vertical transverse sectional view on a plane indicated by the line 3—3 of Figure 1, Figure 4 is a fragmentary detail on a plane indicated by the line 4—4 of Figure 3, and Figure 5 is a fragmentary sectional view on a plane indicated by the line 5—5 of Figure 1, and Figure 6 another fragmentary view on a plane indicated by the line 6—6 of Figure 3.

In the drawing similar reference characters are used to designate corresponding parts in all the views.

In the drawings the front wall of a cattle stall, designated 10, is provided with a plurality of openings 11, in which are mounted stanchions comprising upper and lower end bars 12 and 13 respectively, that are pivotally mounted as shown at 14 and 15, respectively, on the upper and lower rails 16 and 17, respectively, of the wall 10, and have a fixed vertical bar 18 connecting the horizontal bars 12 and 13, and a pivoted bar 19 mounted to pivot as shown at 20 on the lower bar 13, and movably mounted in a slotted opening 21 in the upper bar 12, said bars 18 and 19 being spaced when in their most adjacent positions to receive the neck of the animal. The free end of the bar 19 has a reduced portion 22, and pivotally secured in the slotted extension 23 of the upper bar 12 is a latch member 24 that engages the reduced end 22 and is pivotally mounted as shown at 25. The upper bar 16 of the front wall 10 is provided with slotted openings 26 that aline with the slots 21 in the extensions 23 so that the latch members 24 may be swung into said slotted openings 26 when it is desired to release the cattle from the stanchions, said latch members being of sufficient weight to move them to latching position when the bar 19 is moved away from supporting the latch members in securing the cattle in the stanchions.

The partition members that are now to be described may obviously be used with any means for holding the cattle in position in the stalls other than the stanchions shown and hereinbefore described, said partitions being arranged between adjacent stalls, and although but one partition is shown in the drawing, the illustration being limited to a two stall stable, obviously a number of stalls may be arranged in line, and the partitions arranged between adjacent stalls.

The partition includes a partition bar 27 that is pivotally mounted as shown at 28 between ears 29 secured to a panel 30 between adjacent stalls, and on opposite sides of an arcuate recess 31 in said panel 30, said arcuate recess 31 being adapted to receive the extended end 32 of the partition bar, and serving to effectively hold the partition bar from sidewise movement relatively to the panel. Pivotally mounted below the partition bar 27 is a brace bar 33, 34 designating the pivot, and 35 ears supporting the brace bar 33 by means of the pivot 34. Pivotally secured to the free end of the brace bar 33 is a sleeve 36, 37 designating a pivot, said sleeve embracing the partition bar 27 and having an extension 37' thereon in which is slidably mounted a latch bolt 38 having an enlarged head 39, and a reduced extension 40 that engages in sockets 41 in the partition bar 27 to hold the partition bar in lowered position as shown in full lines in Figure 3, or in dotted line position as also shown in the same figure when raised for release of the cattle in the stable. 42 is an expansible coil spring for normally holding the latch bolt in engaged position in one or the other of the sockets 41.

It will be apparent that in my improved construction of partition, the brace member 33 by being mounted below the partition bar 27 not only effectually braces said partition bar, and also by means of the sleeve 36 secured thereto will hold the partition bar in lowered or raised position, but also when the partition bar is in a lowered position to provide for separating cattle in adjacent stalls, the brace bar forms an effective barrier in combination with the partition bar to prevent the cattle from straying into the wrong stalls and interfering with the cattle in the neighboring stall preliminary to securing them by means of the stanchions or other securing means as hereinbefore described.

It will also be apparent that when the partition bars are raised as shown in broken lines in Figure 3, the brace bars are moved out of the way of the cattle and do not in anywise provide an obstacle to releasing the cattle from the stable.

What is claimed is:—

In a cattle stall, in combination with an upright front wall, spaced ears projecting outwardly from said wall, the wall provided with an arcuate recess between said ears, a partition bar pivoted intermediate of its ends between the outer portions of said ears and having one end movable in said arcuate recess, said arcuate recess providing means permitting swinging of the partition bar in a vertical plane only, and also providing means whereby the partition bar is effectively held from sidewise movement, the partition bar being provided with sockets in its upper face, a sleeve slidably mounted on said partition bar, a latch member carried by said sleeve and cooperating with said sockets selectively, and a brace bar pivotally connecting said sleeve and front wall, the sockets being so located that the sleeve is held in one position with the partition bar and brace bar downwardly inclined to confine an animal in its stall and that the sleeve is held in another position with the partition bar and brace bar upwardly inclined to provide for ingress and egress relatively to the stall.

GEORGE A. MILLER.